United States Patent [19]

Shen et al.

[11] Patent Number: 5,962,367
[45] Date of Patent: Oct. 5, 1999

[54] TITANIA (TIO₂) SUPPORT AND PROCESS FOR PREPARATION AND USE OF THE SAME

[75] Inventors: Binglong Shen, Zhejiang; Dingyi Li, Beijing; Yanlai Shen, Zhejiang, all of China

[73] Assignee: Dequing Chemical Industry and Technologies Co., Ltd., Zhejiang Province, China

[21] Appl. No.: 08/850,152

[22] Filed: May 2, 1997

Related U.S. Application Data

[63] Continuation of application No. PCT/CN94/00087, Nov. 4, 1994.

[51] Int. Cl.⁶ .............................. B01J 21/06; B01J 23/10; B01J 23/70
[52] U.S. Cl. .................. 502/439; 502/302; 502/303; 502/304; 502/305; 502/308; 502/309; 502/313; 502/319; 502/320; 502/321; 502/322; 502/323; 502/325; 502/327; 502/332; 502/335; 502/337; 502/349; 502/350; 502/351
[58] Field of Search ...................... 502/302, 303, 502/304, 305, 309, 313, 319, 320, 321, 322, 323, 325, 327, 332, 335, 337, 349, 350, 351, 439

[56] References Cited

U.S. PATENT DOCUMENTS

| | | |
|---|---|---|
| 4,012,340 | 3/1977 | Morimoto . |
| 4,081,510 | 3/1978 | Kato et al. .............................. 423/237 |
| 4,097,413 | 6/1978 | Simpson . |
| 4,102,822 | 7/1978 | Mulaskey ............................. 208/254 H |
| 4,128,505 | 12/1978 | Mikovsky et al. . |
| 4,179,410 | 12/1979 | Simpson . |
| 4,196,101 | 4/1980 | Wilson et al. . |
| 4,465,790 | 8/1984 | Quayle ..................................... 502/309 |
| 4,537,873 | 8/1985 | Kato et al. .............................. 502/242 |
| 4,593,014 | 6/1986 | Halluin et al. .......................... 502/242 |
| 4,687,757 | 8/1987 | Parrott et al. . |
| 4,891,348 | 1/1990 | Imanuri et al. ......................... 502/309 |
| 5,128,291 | 7/1992 | Wax et al. .................................. 502/8 |
| 5,319,996 | 6/1994 | Itoh ........................................ 502/238 |
| 5,484,757 | 1/1996 | Szymanski et al. .................... 502/439 |

FOREIGN PATENT DOCUMENTS

| | | |
|---|---|---|
| 0 339 640 A1 | 11/1989 | European Pat. Off. . |
| 0 370 757 A1 | 5/1990 | European Pat. Off. . |
| 0 542 527 A1 | 5/1993 | European Pat. Off. . |

*Primary Examiner*—Elizabeth D Wood
*Attorney, Agent, or Firm*—Brinks Hofer Gilson & Lione

[57] ABSTRACT

A support suitable for catalyst having a surface area in the range of from 80 to 200 m²/g, a pore volume of from 0.3 to 0.5 ml/g, a side compression strength of from 70 to 240 N/cm and a pore diameter of from 60 to 200 Angstom units. The support contains from 60% to 100% by weight titania ($TiO_2$) and from 0% to 40% by weight alumina ($Al_2O_3$). The support is produced by raw material of titania. The invention also provides process for producing said support and catalyst employing the same.

16 Claims, No Drawings

TITANIA (TiO$_2$) SUPPORT AND PROCESS FOR PREPARATION AND USE OF THE SAME

CROSS REFERENCE TO RELATED APPLICATION

This application is a continuation application of PCT/CN94/00087, filed Nov. 4, 1994, which is hereby incorporated by reference.

FIELD OF THE INVENTION

The invention relates to a new type of titania supports, its preparation process and its use to the preparation of catalysts.

BACKGROUND OF THE INVENTION

Titania is one of the most important titanium-based products, and it is also an important chemical feed stock. The majority of titanium resources are used for preparing titania. The consumption of titania is one of the symbols measuring the living standard of a country. There are rich resources of titanium and rare earth in China. Therefor, it is of great significance to study and develop the application fields of titanium, titania and rare earth elements.

For a supported metal catalyst, the interaction between metal and support is one of the factors that influence the activity and selectivity of the catalyst. The support plays an important role for the performance of the catalyst. S. T. Taustar (J. Am. Chem. Soc. 100, 170(1978)) discovered that the strong interaction between titania and metals (Strong Metal-Support Interaction, i.e., SMSI) greatly influences the performance of the catalyst. Therefore, studies on this subject have become an active field since then. As a new catalytic material, titania is being paid a great attention. People hope to obtain supports having better performances than alumina supports, which are widely used at present in this field. But up to now, research in this field still remains on theoretical and fundamental stage, and there is no reports with practical value.

In addition, in order to make titania an industrial catalyst support of practical value, it must have excellent physical and mechanical properties, and be feasible in economy, so as to satisfy various demands for different catalysts. The commercialized titania such as commercial titanium white can not satisfy the above-mentioned demands. The following catalysts, the supports of which contain titania, have not achieved the stage of industrial application because of the above-mentioned reasons.

European Patent Application 0339640A provides a co-precipitated alumina-titania composite which can be used as a catalyst and a catalyst support. The composite contains from 0.5 to 50wt. % of TiO$_2$ based on the total weight of the composite. The average size of the titania particle, which is uniformly distributed in the bulk, is smaller than 50 Å. When the co-precipitated alumina-titania composite is calcined at a temperature over 300° C., the individual titania particle can not be distinguished from alumina matrix by X-ray diffraction. Since this alumina-titania composite is prepared by co-precipitation of water-soluble titanium salts (for example, TiCl$_3$, TiOSO$_4$ and TiOCl$_2$) with water-soluble aluminum salts (for example, NaAlO$_2$, KAlO$_2$ or Al(NO$_3$)$_3$, AlCl$_3$ and Al$_2$(SO$_4$)$_3$), the cost of raw materials is high, therefore it is not feasible in economy.

Other catalysts, the support of which contains titania, are reported in the following literature:

U.S. Pat. No. 4,992,406 (Mauldin et al.) provides a support for making catalysts which are used in the conversion of synthesis gas to hydrocarbons. The support contains titanium, in which an inorganic oxide binder selected from aluminum or zirconium is incorporated. The amount of the binder is in the range of from about 0.1 to 20% by weight based on the total weight of the titania-binder support. The provided titania-binder support has a pore volume ranging from about 0.2 cc/g to 0.5 cc/g, and a surface area ranging from about 8 m$^2$/g to about 70 m$^2$/g. A catalytically effective amount of metals such as cobalt, or cobalt plus an additional metal is dispersed on the support and thus the catalysts useful for Fischer-Tropsch synthesis are obtained.

U.S. Pat. No. 4962078 (Behrmann et al.) provides a cobalt-titanium catalyst, which is used for the production of hydrocarbons from synthesis gas, and its preparation process. The catalyst is prepared by dispersing and inlaying cobalt in a support as catalytically active layers. This support contains at least about 80% by weight of titania.

U.S. Pat. No. 5,130,285 (Wang et al.) provides a cobalt-molybdenum catalyst with a mixed titanium-zirconium-molybdenum oxide as a support. This catalyst is used for hydrodesulfurization of fuel oil. The support is prepared by adding aqueous ammonia to an anhydrous solution of titanium, zirconium and vanadium compounds such as chlorides to obtain a co-precipitate.

U.S. Pat. No. 4,196,101 (Wilson et al.) uses titanium tetrachloride or an organo-titanium compound such as titanium alkoxide, Ti(OR)$_4$, to prepare titanium-containing alumina pellets (tablets) and catalysts prepared with these pellets (tablets). The alumina pellets (tablets) contain from about 1 to 40% of titanium as TiO$_2$ based on the total weight of aluminum (as Al$_2$O$_3$) plus titanium (as TiO$_2$).

U.S. Pat. No. 4,465,790 (Quayle) provides a hydrodenitrogenation catalyst comprising catalytic metals such as molybdenum and nickel on a support of co-precipitated alumina and titania (wherein the content of titania is in the range of from about 5 to 40%.

In addition, CN103900A (Application No. 89104390) and Japanese patent JP53095893 indicate that titania prepared by hydrolysis of titanyl chloride and titanium chloride etc., does not meet the demands for the industrial application not only in the performance but also in the economical consideration.

In addition to the above-mentioned unique SMSI effect, titania is ready to lose and gain oxygen easily, and can also adsorb hydrogen sulfide. Therefor, titania can be a support as well as an active component. It is very necessary to further study the titania support, and to seek for a simple and economical process for preparing it.

DISCLOSURE OF THE INVENTION

The object of the present invention is to overcome the shortages in the art, provides a titania support which is of industrial value, can be prepared with cheaper titania as raw material, and has better physical and mechanical properties.

Another object of the present invention is to provide a process for preparing the above-mentioned support.

The present invention also provides the use of the above-mentioned support in preparing catalysts, and provides hydrodesulfurization catalysts and methanation catalysts prepared by using the support of the present invention.

The objects of the present invention have been achieved by the following ways:

The present invention provides a catalyst support prepared by using titania as a raw material. This support contains titania and has a surface area ranging from 80 to 200 m²/g, a pore volume ranging from 0.3 to 0.5 ml/g, a side compression strength ranging from 70 to 240 N/cm, and a most probable pore diameter ranging from 60 to 200 Å. The most probable pore diameter can be controlled in a narrower range, such as 80–100 Å or 100–120 Å.

The catalyst support according to the present invention preferably comprises titania ranging from 60 to 100% by weight and alumina ranging from 0 to 40% by weight. Specific surface area of said support can be distributed in the range of 60 to 100 m²/g or 80 to 120 m²/g respectively.

The catalyst support according to the present invention is prepared by the following process: molding a mixture of titania and alumina, which service as basic raw materials, 0 to 10 wt. % of molding additive, 0 to 5 wt. % of pore-enlarging agent, 0.1 to 0.3 wt. % of crystal form-converting agent based on the total weight of the raw material, then drying at 80–120° C. for 8–16 h, and finally calcining it at 0–50 mMH₂O, 350–650° C. for 1–6 h.

In the above-mentioned preparation process, the content of said titania (as TiO₂ in the final product), which serves as a basic raw material, is preferably in the range of from 60 to 100% by weight, and the content of said alumina (as Al₂O₃ in the final product) is preferably in the range of from 0 to 40% by weight, based on the total weight of the final support.

The cheaper commercial titanium white can be used as a raw material in this invention. Impurities in the titanium white must be removed before admixing it with other raw materials, and then the titanium white is crushed to powders with the particle size equal to or smaller than 160 mesh.

Among other subsidiary raw materials for improving the performance of the catalyst, the said molding additive is one selected from the group consisting of sulfuric acid, hydrochloric acid, nitric acid, aluminum sol, aluminum gel and titanium glue or a combination thereof; the said pore-enlarging agent is one selected from the group consisting of polyvinyl alcohol, sesbania powders, carboxymethyl cellulose, active carbon, starch, saccharide and stearate or a combination thereof, and the said crystal form-converting agent is selected from zinc salts or hydroxide.

The present invention is further explained as follows:

The process for preparing titania supports presented in the present invention is to use titanium oxide and aluminum oxide as basic raw materials, in which low grade commercial titanium white can be used as a raw material after being treated. After adding some subsidiary materials such as molding additives, pore-enlarging agents and crystal form-converting agents, the said support is obtained through steps of admixing, kneading, molding and calcining, in which, the calcination temperature is controlled at 350–500° C., and calcination time is 4–5 h. The molding can proceed by using methods known in the art, such as extruding, by which the support is made into a strip shape(such as a three-leaves-like strip shape or a cylinder shape), or other shapes suitable for industrial application.

Catalyst supports of the present invention preferably comprise titania more than 60–100% of the total weight of the support. When the content of titania in the support is lower than 60%, the supported catalysts still have good performances, and are also superior to the same catalysts supported on alumina supports, but the comprehensive economic and technical indices are not as good as the supported catalysts in which the content of the titania is higher than 60%.

The content of titania in the supports is preferably regulated within the range of 60 to 100%, and the content of alumina is preferably regulated under 40%, thereby a series of titania supports for the different demands can be obtained.

The supports having different physical and mechanical properties and different appearance can be obtained according to the selected contents of the raw materials, molding conditions and calcining temperatures, etc.

The added amount of subsidiary raw materials such as the molding additive, the pore—enlarging reagent and the crystal form-converting agent is regulated according to the demands for preparing different supports. The selection principle of the amount is well known to those skilled in the art.

By the above-mentioned method, the catalyst supports can be prepared, with the surface area controlled in the range of 80 to 200 m²/g, the pore volume controlled in the range of 0.3 to 0.5 ml/g, the most probable pore diameter ranging from 60 Å to 200 Å or a narrower range such as 80–100 Å or 100–120 Å, the side compression strength controlled in the range of 70 to 240 N/cm.

The supports prepared by the above-mentioned method can be used as supports to replace the existing γ-Al₂O₃ for preparing various types of catalysts, such as hydrodesulfurization catalysts and methanation catalysts and the catalytic activity can be remarkably improved.

Hydrodesulfurization catalysts and methanation catalysts are selected as examples to illustrate the practical application of the supports according to the present invention, but it should not be considered as a limitation to the present invention.

Generally, hydrocarbon feed stocks such as natural gas, oil field gas and petroleum products contain a small amount of impurities such as sulfides, including organic sulfides and inorganic sulfides, which can cause the poisoning and deactivation of the catalysts. Therefor, they must be removed. In general, inorganic sulfides can be removed easily, and organic sulfides are removed with difficulty. The basic principle of removing organic sulfides is to convert the small amount of organic sulfides contained in the hydrocarbon feed stocks to hydrogen sulfide firstly by reacting them with hydrogen and then to remove hydrogen sulfide. A hydrogenation catalyst is needed for the converting reaction of organic sulfides to hydrogen sulfide. In the presence of the catalyst, the main reactions of hydrogenation conversion of the organic sulfides in the hydrocarbon feed stocks are as follows:

RSH+H₂→RH+H₂S
R₁SR₂+2H₂→R₁H+R₂H+H₂S
R₁SSR₂+3H₂→R₁H+R₂H+2H₂S
C₄H₄S+4H₂→C₄H₁₀+H₂S
COS+H₂→CO+H₂S

Wherein, R, R₁ and R₂ indicate a alkyl group respectively.

At present, hydrogenation catalysts for the conversion of organic sulfides are mainly cobalt molybdate, nickel molybdate and iron molybdate and so on, among which, the catalytic performance of cobalt molybdate catalysts is the best and most of them use γ-Al₂O₃ as the support.

Cobalt molybdate hydrodesulfurization catalysts supported on the alumina support have the following shortages: (1) Before using, they have to be pre-sulfurized, otherwise, the catalyst show no activity (when temperature is lower than 300° C.) or low activity (when temperature is lower than 350° C.); (2) When the sulfur content in the feed hydrocarbons is relatively low, it is necessary to supplement the feed stocks with sulfur, otherwise, the catalytic activity will be reduced; (3) Comparatively high temperatures are necessary for the hydrodesulfurization; (4) The amount of cobalt and molybdenum loaded in the catalyst is comparatively large, usually 2–3% cobalt, 11–13% $MoO_3$.

In order to overcome the shortages mentioned above, we propose that titania supports prepared according to this invention replace the commonly used $\gamma$-$Al_2O_3$ supports. The anatase type titania support is preferable, and the dynamic co-impregnation method is used for supporting the cobalt and molybdenum active components, the loading of which decreases remarkably compared with the same kind catalysts supported on the $\gamma$-$Al_2O_3$ support (by a factor of about ⅓), while catalytic activity increases remarkably. The conversion of thiophene is about twice as high as that when $\gamma$-$Al_2O_3$ is used as the support, and the cost is lowerd.

The above-mentioned hydrodesulfurization catalyst is prepared by the following steps:

Selecting anatase type titania, which is molded to Φ3×6~10 mm strip shape;

Preparing the impregnating solution(active component solution) by dissolving solid ammonium molybdate in aqueous ammonia first, then adding cobalt nitrate solution at 40–50° C. with thorough stirring, and then adding stabilizer, ethylene diamine with continuing stirring to obtain a solution, i.e., active component impregnating solution, with the ratio of the active components in the impregnating solution being: Co/Mo=0.19–0.36;

Preparing the hydrodesulfurization catalyst with the dynamic co-impregnation method by placing the selected titania support into a stainless container with holes on the walls, then immersing it into the impregnating solution and letting the solution flow, the temperature of impregnation being 60° C., preferably 35–45° C., impregnation time being 1–5 h, preferably 4–5 h; after finishing the impregnation, lifting the container and separating solid from liquid, drying the separated catalyst at 80–150° C., preferably 90–110° C. for 4–16 h, preferably for 10–14 h, and activating the dried catalyst at 380–600° C. for 1–6 h, preferably at 450–500° C. for 2–3h, then cooling it naturally, finally obtaining a hydrodesulfurization catalyst, in which the content of the active components: $MoO_3$<9wt. %, Co<1.5 wt. %;

Appearance: Φ3 mm×6~10 mm, shallow gray strip-shape;

Packing density: 0.9–1.1 g/ml;

Side compression strength: ≧80N/cm;

Attrition rate: <3%.

The obtained catalysts have good physical and mechanical properties.

The hydrodesulfurization catalyst of the present invention shows so high a catalytic activity that the conversion of thiophene attains 90–100%.

When using the hydrodesulfurization catalyst of the present invention, the content of organic sulfur in the hydrocarbon feed stocks can decrease from 100–200 ppm to below 0.1 ppm, and the pre-sulfurizing step can be omitted in ammonia and hydrogen plants without polluting the environment. The catalyst can also be used even when the content of sulfur in the feed stocks is low without supplementing the feed stocks with sulfur. In addition, the catalytic performance is also good in low temperature, and the activity at 250° C. is higher than that of the same kind of of the catalysts at 350° C. supported on $\gamma$-$Al_2O_3$ support.

In addition, when the above-mentioned catalyst is used in the hydrodesulfurization of the cock furnace gas and semi-water gas, i.e., $CO+CO_2$>15%, no methanation reaction and temperature jump occur, and the conversion of organic sulfur is 97%.

The second embodiment of the titania support of the present invention is the preparation of the methanation catalyst.

The methanation catalyst is generally utilized to purify a little CO, $CO_2$ existing in the synthesis gas, in order to prevent the catalyst from poisoning and deactivation. The principle of removing CO and $CO_2$ is to cause their methanation. The methanation is a strong exothermic reaction under the adiabatic conditions and in hydrogen or hydrogen-nitrogen, every 1% reacted CO gives rise to a 74° C. temperature increase, and every 1% reacted $CO_2$ gives rise to a 60° C. temperature increase. In addition, oxygen in the feed gas will oxygenate active nickel and burn hydrogen, whereby a large quantity of heat will release. Every 1% reacted $O_2$ will result in a 160° C. temperature rise and therefor the content of CO, $CO_2$ and $O_2$ must be strictly controlled, and a good heat-resistance is required for the methanation catalysts. The main reactions for removing CO and $CO_2$ are as follows:

| | |
|---|---|
| $CO + 3H_2 \rightarrow CH_4 + H_2O$ | $\Delta H_{25° C.} = -49.27$ cal/mol |
| $CO_2 + 4H_2 \rightarrow CH_4 + 2H_2O$ | $\Delta H_{25° C.} = -39.43$ cal/mol |

The conventional preparing method of the methanation catalyst is to admix the components of nickel, magnesium, rear earth and aluminum, then pellet and calcine the mixture. The impregnating method, in which the active components are supported on the $\gamma$-$Al_2O_3$ support, is also used. No matter what method is used, the obtained methanation catalysts have some shortages: (1) the activity is comparatively low at low temperatures, and it is necessary to raise temperature to above 300° C. in order to maintain higher activity; (2) the coke formation-resistance is bad; (3) extremely poisonous carbonyl nickel is formed at low temperature, e.g. below 240° C., which not only causes the catalyst deactivation, but also is very harmful for human bodies; (4) the content of nickel is high, and in some cases it is higher than about 25 wt. %. The low nickel-containing, methanation catalyst still contains about 17wt. % of nickel, which will certainly increase the cost of the catalyst.

To overcome the shortages mentioned above, the methanation catalyst is improved in the present invention. A titania support prepared according the present invention is used to replace the commonly used $\gamma$-$Al_2O_3$ support. A dynamic co-impregnation method is used for supporting of nickel and rear earth active components, wherein the loading of the active components decreases remarkably compared with the same kinds of catalysts supported on a $\gamma$-$Al_2O_3$ support (decreases by about ⅓), while the catalytic activity increases remarkably, and the cost decreases.

The methanation catalyst is prepared using the titania support of the present invention though the following steps:

Selecting the titania support according to the present invention;

Preparing impregnating solutions(active component solution) by firstly, dissolving the rear earth metal oxides in nitric acid to form the nitric acid solution of rear earth metal oxides and dissolving nickel nitrate in water and then admixing the two solutions with through stirring to obtain an active component impregnating solution, with the molar ratio of the active components in the impregnating solution being:

Re (rare earth): Ni=0.21–0.35;

and the rare earth metal oxides ($Re_2O_3$) can be selected from the group consisting of lanthanum oxide ($La_2O_3$), cerium oxide ($Ce_2O_3$), promethium oxide ($Pr_2O_3$) and erbium oxide ($Er_2O_3$) and so on or La-rich rare earth;

Preparing the methanation catalysts using a dynamic co-impregnation method by placing the selected titania support into a stainless container with holes on the wall, then immersing it into the impregnating solution and making the solution in a flowing state, the temperature of impregnation being 60–90° C., preferably 70–90° C., impregnation time being 1–5 h, preferably 3–4 h; and after finishing the impregnation, lifting the container, separating solid from liquid, drying the separated catalyst at 80–130° C. for 8–16 h, preferably 90–110° C., for 10–12 h, then cooling it naturally, finally obtaining a methanation catalyst, in which the amount of active components are Ni<7wt. %, Re<3wt. %.

Appearance: Φ5mmx8~12 mm, shallow gray-strip shape;

Packing density: 1.0–1.2 g/ml;

Side compression strength: ≧150N/cm;

Attrition rate: <8%.

When using the above-mentioned methanation catalyst, the small amount of CO and $CO_2$ in the synthesis gas (usually $CO+CO_2<0.8\%$) is removed to below 0.1 ppm. The activity of the catalyst is good at even low temperatures, and the activity at 250° C. is higher than that of the same kinds of catalyst supported on γ-$Al_2O_3$ support at 300 C. The performance of carbonyl nickel formation-resistance of this catalyst is 10 times as good as similar catalysts supported on a γ-$Al_2O_3$ support, and the performance of coke formation-resistance is several times high as similar catalysts supported on a γ-$Al_2O_3$ support. This catalyst favors long carbon chain formation, therefor, it brings new resources of organic raw materials. This methanation catalyst can also be utilized for producing substitution natural gas and town gas.

The Best Mode for carrying out the present invention

The alumina used in the following examples is a commercial alumina with a solid content of 50–65%. Other chemical materials are all of the commercial product of industrial grade except those otherwise specified.

EXAMPLE 1

Preparation of the titania support (1) Pre-treatment: The commercial low grade titanium white was treated with sulfuric acid. After hydrolyzing with crystal seeds, titanium oxide (with 30–50% solid content) was obtained by removing the mother liquor. The oxide was washed, the pH of which was about 7.0±0.5, and then dried at 110±10° C. for 8–14 h, and finally crushed to <150 mesh powders.

(2) Admixing and processing : Into 100 parts of the titanium oxide prepared in (1), 5% of sesbania powders and 0.3% of zinc carbonate were added. The mixture was thoroughly admixed by a mixing machine. Then 3% of aluminum gel and 3% carboxy methyl cellulose were added to the said mixture and this was kneaded thorough. The paste was extruded into three-leaves-like strip or cylinder shape having dimensions of Φ3 mmx6~8 mm, and then dried at 110±10° C. for 8–12 h.

(3) Calcination: The above-mentioned three-leaves-like strips shape support were calcined in an furnace at 0–50 mm$H_2O$, 450–550° C. for 4–5 h, and thus a $TiO_2$ support was obtained.

EXAMPLE 2

Preparation of the titania support (1) Pre-treatment: Titanium oxide (with 50–65% solid content) was prepared by using the same procedure as in the step (1) of Example 1, then dried at 110±10° C. for 8–14 h, and crushed to 160 mesh powders for use with a universal crushing machine.

(2) Admixing and processing: Into 80 parts of the titanium oxide prepared in (1), 20 parts of aluminum oxide, 5% of sesbania powders, 2% carboxy methyl cellulose and 0.2% of zinc carbonate were added, and the mixture was admixed in a mixing machine. Then 40 parts of 5% nitric acid was added to the said mixture and this was kneaded thoroughly, The paste was extruded into cylinder shape having dimensions of Φ5 mmx8~12 mm, and dried at 110±10° C. for 8–14 h.

(3) Calcination: The above-mentioned cylinder shape support was calcined in an furnace at 0–50 mm$H_2O$, 450–550° C. for 4–5 h, and thus a titania support was obtained.

EXAMPLE 3

Preparation of the titania support (1) Pre-treatment: Commercial low grade titanium white prepared by chlorination process and aluminum oxide prepared by using the same procedure as in Example 2 were got ready for use.

(2) Admixing and processing: 12.4 kg of the above-mentioned titanium oxide, 7.6 kg of the aluminum oxide, 1 kg of sesbania powder and 0.06 kg of zinc carbonate were admixed, and then 7.5 kg of 5% nitric acid and 0.6 kg of carboxy methyl cellulose were added to the mixture, and this was kneaded thoroughly. The paste was extruded into cylinder shape having dimensions of Φ3 mmx6~10 mm or Φ5 mmx8~12 mm, and dried at 110±10° C. for 8–12 h.

(3) Calcination: The above-mentioned cylinder shape support was calcined in an furnace at 0–50 mm$H_2O$, 450–550° C. for 4–5 h, and thus a titania support was obtained.

EXAMPLE 4

Preparation of the hydrodesufurization catalyst (1) Preparation of impregnating solution: 19.6 g of ammonium molybdate ($NH_4Mo_4O_{24}$) was dissolved in 15% of aqueous ammonia first, then a cobalt nitrate aqueous solution (containing 13.5 g $Co(NO_3)_2 \cdot H_2O$) was added at 40–50° C. The mixed solution was stirred and 1.38 ml ethylene diamine was added with continuous stirring to obtain an active component-containing impregnating solution.

(2) Preparation of the catalyst: 100 g of the support having dimensions of Φ3mmx6~10 mm prepared in Example 1, was placed into a stainless basket. Then it was immersed into the impregnating solution and the solution was let to flow cyclically, with the impregnation temperature being 35–45° C., impregnation time being 4–5 h. After the impregnation was finished, the basket was lift, and water was removed. Then the wetted catalyst was dried at 100±10° C. for about 10 h in an oven. The dried catalyst was activated at 450° C. for 2 h in an furnace. Thus a hydrodesulfurization catalyst was obtained, in which the content of active components was 8.56wt % of $MoO_3$ and 1.40 wt % of cobalt Appearance: Φ3mmx6~10 mm, gray-blue, strip shape Packing density: 1.06 g/ml Side compression strength: ≧80N/cm Attrition rate: <3%

Specific surface: about 100 $m^2/g$

Pore volume: about 0.35 ml/g.

Activity test: Catalytic activity was measured by using a pulse-microreaction-chromatography method; result: conversion of thiophene was 91.1–100% at 350° C.

EXAMPLE 5

Preparation of the hydrodesufurization catalyst (1) Preparation of impregnating solution: 98 g of ammonium molybdate was dissolved in 300 litters of 16% aqueous ammonia, and 66 kg of cobalt nitrate was dissolved in 137 litters of 16% aqueous ammonia. After they completely dissoving, the two solutions were admixed thoroughly, and 7 litters of ethylene diamine was added with stirring. The mixture was held at 45±3° C. for use.

(2) Preparation of the catalyst: 300g of the support prepared in Example 1 was placed into a stainless hanging basket. Then it was immersed into the impregnating solution and the solution was let to flow cyclically, with the temperature of impregnation being 35–45° C., impregnation time being 4–5 h. After the impregnation was finished, the basket was lift, and water was removed. Then the wetted catalyst was dried at 100±10° C. for about 12–14 h in an oven, and the dried catalyst was activated at 450–500° C. for 2–3 hours in an furnace. Thus a hydrodesulfurization catalyst was obtained, in which the content of the active components is 7.56 wt % of $MoO_3$ and 1.20 wt % of cobalt.

Appearance: Φ3 mmx6~10 mm, three leaves-like strip shape, gray-blue

Packing density: 1.06 g/ml

Side compression strength: >80N/cm

Attrition rate: <3%

Specific surface: about 100 m$^2$/g

Pore volume: about 0.35 ml/g

Activity test: measuring the catalytic activity by using the HG/T2514 standard result: conversion of thiophene was 94%.

EXAMPLE 6

Preparation of the methanation catalyst (1) preparation of impregnating solution: 6.6 g of lanthanum nitrate was dissolved in 16 ml of nitric acid aqueous solution with a concentration 1:1, and 100 g of nickel nitrate was dissolved in 200 ml of water. Then the two solutions were admixed thoroughly to obtain an active component-containing impregnating solution.

(2) Preparation of the catalyst: The support with dimensions of Φ5 mmx8–12 mm, prepared by the Example 2, was placed into a stainless hanging basket. Then it was immersed into the impregnating solution and the solution was let to flow cyclically, with the temperature of impregnation being 70–90° C., impregnation time being 1–3 h. After the impregnation was finished, the basket was lift, and water was removed. Then the-wetted catalyst was dried at 90–110° C. for about 10–12 h in an oven and the dried catalyst was activated at 400–500° C. for 3–4 h in an furnace. Thus the methanation catalyst was obtained, in which the content of the active components are 5.6 wt % of nickel and 1.9 wt % of lanthanum.

Appearance: Φ5 mmx8~12 mm, gray, cylinder shape

Packing density: 1.08 g/ml

Side compression strength: ≧180N/cm

Attrition rate: 6% (<8%)

Specific surface: about 100 m$^2$/g

Pore volume: about 0.35 ml/g

Activity test: catalytic activity was measured by using HGI-1203-79 standard issued by Minstry of Chemical Engineering, P. R. China; result: at 250° C., $CO_2$ was 0.8% at inlet, and less than 1 ppm at exit.

EXAMPLE 7

Preparation of the methanation catalyst (1) preparation of impregnating liquid solution: 500 kg of nickel nitrate was dissolved in 150 litters of water, and 33 kg of lanthanum-rich rare earth was dissolved in 80 litters of a nitric acid aqueous solution(1:1 $HNO_3$). Then the two solutions was admixed thorughly. The content of the active component in the impregnating solution is:

Re (rare earth) : Ni=0.21–0.27.

(2) Preparation of the catalyst using dynamic co-impregnation method: 300 kg of the support with dimensions of Φ5 mmx8~12 mm, prepared by the Example 3, was placed into a stainless basket, Then it was immersed into the impregnating solution and the solution was let to flow cyclically, with the temperature of impregnation being 60–90° C., impregnation time being 1–5 h. After the impregnation was finished, the basket was raised, and water was removed. Then the wetted catalyst was dried at 80–130° C. for about 8–16 h in an oven. And the dried catalyst was activated at 380–600° C. for 1–6 hours in an furnace. Then it was cooled naturaly, and a methanation catalyst was obtained, in which the content of the active components is 5.9 wt % of nickel and 1.9 wt % of rare earth.

Appearance: Φ5 mmx8~12 mm, gray, strip shape

Packing density: 1.16 g/ml

Radial crush-resistance strength: 242N/cm

Attrition rate: 6% (<8%).

Activity test: catalytic activity was measured by using a fertilizer catalyst industry standard of Minstry of Chemical Engineering, P. R. China; result: $CO_2$ was 29×10$^{-6}$ at exit.

Industrial applicability

EXPERIMENT 1

The application of the hydrodesulfurization catalyst in an ammonia synthesis plant:

The feed stock was natural gas containing 97.4% of $CH_4$, and the reaction conditions were temperature: 230–280° C., pressure: 1.1–1.5MPa, and space velocity 400–10000 h$^{-1}$. When the temperature of catalyst bed reached 270–280° C., the catalyst was put into use, and the operation proceeded smoothly. The total content of organic sulfides was 0.324–2.304 mg/m$^3$ at inlet, and 0.05–0.12 mg/m$^3$ at exit, and the conversion of the total organic sulfur was about 90%, which could fully satisfy the demand for the desulfurization of the feed stocks in ammonia production.

Under the same conditions, the conversion of the total organic sulfur was about 50% on a hydrodesulfurization catalyst supported on the alumina support.

EXPERIMENT 2

The application of the methanation catalysts in an ammonia synthesis plant

The feed stock was natural gas containing 97.4% of $CH_4$, which was introduced into the methanation reactor after desulfurizing, first and second stage conversions, middle-temperature shift and low-temperature shift. The reaction conditions were temperature 290–300° C., pressure 2.4–2.8MPa, and space velocity 1600–3600 h$^{-1}$. When the temperature reached 280° C., the catalyst was put into use, and the operation proceeded smoothly. The content of $CO+CO_2$ was 0.2–0.8% at the inlet of the methanation reactor, and after reaction, the content of $CO_2$ was lower than 1 ppm at exit. Determination results by infrared gas analyzer of Uras-3G type showed that this could fully satisfy the demand for removing small amount of CO and $CO_2$ in synthesis gas in the ammonia production. Under the same conditions, the content of $CO_2$ at exit was 20–30 ppm on a methanation catalyst supported on the aluminum oxide support.

EXPERIMENT 3

The assessing example at lateral line of a ammonia synthesis plant for the methanation catalyst Under the conditions listed in table 1, the performance was assessed for the methanation catalyst prepared in example 7 of the present invention using titania as the support and the methanation catalyst (J15) using $Al_2O_3$ as the support at lateral line in an ammonia synthesis plant. The result indicated that the performance of the methanation catalyst using the titania of the present invention as the support was clearly superior to that of the methanation catalyst using $Al_2O_3$ as the support. The experiment result is shown in Table 1.

TABLE 1

|  | Catalyst | J105 | Catalyst prepared in the Example 7 |
|---|---|---|---|
| Condition | Temperature | 300° C. | 280° C. |
|  | Pressure | 2.8 MPa | 2.8 MPa |
|  | Space velocity | 1000 h$^{-1}$ | 1500 h$^{-1}$ |
|  | CO + $CO_2$ at entrance | <0.7% | <0.7% |
| Exit | CO | <20 ppm | <2 ppm |
|  | $CO_2$ | <10 ppm | <1 ppm |
| Condition | Temperature | 300° C. | 260° C. |
|  | pressure | 2.8 MPa | 2.8 MPa |
|  | space velocity | 1000 h$^{-1}$ | 1500 h$^{-1}$ |
|  | CO + $CO_2$ at entrance | <0.7% | <0.7% |
| Exit | CO | <23 ppm | <3 ppm |
|  | $CO_2$ | <20 ppm | <1.5 ppm |
| Condition | Temperature | 300° C. | 500° C. after heat-resistance |
|  | pressure | 2.8 MPa |  |
|  | space velocity | 1000 h$^{-1}$ | 2.8 MPa |
|  | CO + $CO_2$ at entrance | <0.7% | 1500 h$^{-1}$ |
|  |  |  | <0.7% |
| Exit | CO | <22 ppm | <3 ppm |
|  | $CO_2$ | <15 ppm | 0 ppm |

In addition, when temperature was raised to 600° C. and hold for 30 minutes and then lowered to 300° C., the activity of the catalyst prepared in example 7 was still very good.

EXPERIMENTAL EXAMPLE 4

The assessing example at lateral line of an ammonia synthesis plant for the hydrodesulfurization catalyst Under the conditions listed in Table 2, the performance was assessed for the hydrodesulfurization catalyst prepared in example 6 of the present invention by using the titania as support at lateral line of the ammonia synthesis plant. The result indicated that no methanation reaction and no temperature-rising happened when the content of CO and $CO_2$ in the feed stock gas was very high. This reflected the good performance of the hydrodesulfurization catalyst using the titania of the present invention as the support. The experiment result is shown in Table 2.

TABLE 2

| feed stock conditions | semi-water gas temperature: 260–340° C., pressure: 0.2 MPa, space velocity: 1000 h$^{-1}$ | |
|---|---|---|
|  | Composition of inlet gas (V %) | Composition of exit gas (V %) |
| $H_2$ | 38.47 | 42.68 |
| $N_2$ | 23.80 | 21.56 |
| CO | 23.69 | 22.17 |
| $CO_2$ | 12.42 | 12.09 |
| $CH_4$ | 1.36 | 1.48 |

The conversion of organic sulfur was 97% (measurement by using microcoulombmeter).

What is claimed is:

1. A process for preparing a catalyst support comprising the steps of:
   (a) treating titanium white with sulfuric acid, after hydrolyzing said treated titanium white with crystal seeds, obtaining titanium oxide and mother liquor, removing said mother liquor, washing said titanium oxide to a pH 7.0±0.5, drying said titanium oxide at 110±10° C. for 8 to 14 hours and crushing said titanium oxide to a powder having a particle size less than 160 mesh:
   (b) mixing 60 to 100 parts by weight of the powder obtained by step (a) and 0 to 40 parts by weight of aluminum oxide with 0 to 10 weight percent of a molding additive, 0 to 5 weight percent of a pore-enlarging agent and 0.1 to 0.3 weight percent of a crystal form-converting agent based on the total weight of said titanium oxide and aluminum oxide to obtain a mixture, and after molding, and drying said mixture at a temperature between 80° C. to 120° C. for 8 to 16 hours, then calcining said mixture at 0–50 mm$H_2O$, 350–650° C. for 1 to 6 hours.

2. The process according to claim 1 wherein the content of said titanium oxide, is between about 60 to 100% by weight as $TiO_2$, based on the total weight of the catalyst support, and the content of said aluminum oxide, is between about 0 to 40% by weight as $Al_2O_3$, based on the total weight of the support.

3. The process of claim 1, wherein said titanium oxide is titanium white, from which impurities are removed before it is admixed with said aluminum oxide, said molding additive, said pore-enlarging agent and said crystal form-converting agent; said titanium oxide is crushed to a powder having a particle size less than or equal to 160 mesh.

4. The process of claim 1, wherein said molding additive is selected from the group consisting of sulfuric acid, hydrochloric acid, nitric acid, aluminum sol, aluminum gel and titanium glue or a combination thereof, and said pore-enlarging reagent is selected from the group consisting of polyvinyl alcohol, sesbania powders, carboxy methyl cellulose, active carbon, starch, saccharide and stearate or a combination thereof, and said crystal form-converting agent is selected from the group consisting of zinc salts and zinc hydroxide.

5. A catalyst support prepared according to claim 1.

6. The process of claim 1, wherein said titanium white is prepared by a chlorination process.

7. The catalyst support of claim 5 having a specific surface of 60 to 200 m$^2$/g, a pore volume of 0.3 to 0.5 ml/g, a side compression strength from 70 to 240 N/cm and a pore diameter of between 60 to 200 Å.

8. The catalyst support of claim 7 wherein said specific surface is 60 to 100 m$^2$/g.

9. The catalyst support of claim 8 wherein said specific surface is 80 to 120 m²/g.

10. A process for preparing a hydrodesulfurization catalyst comprising the steps of:
   (a) preparing a catalyst support according to claim 1;
   (b) immersing said catalyst support into a cyclically flowing impregnating solution at a temperature between 35° C. and 60° C. for 1 to 5 hours to form a impregnated support; said impregnating solution comprising an aqueous cobalt nitrate solution and an aqueous ammonia solution of ammonium molybdate wherein the molar ratio of Co/Mo is 0.19 to 0.36;
   (c) drying said impregnated support at 80° C. to 150° C. for 4 to 16 hours to form a dried support; and
   (d) activating said dried support at 380° C. to 600° C. for 1 to 6 hours.

11. The process of claim 10 wherein the catalyst support is immersed in the impregnating solution at a temperature between 35° C. to 45° C. for 4 to 5 hours to form a impregnated support.

12. The process of claim 10 wherein the impregnated support is dried at a temperature between 90° C. and 1 00° C. for 10 to 14 hours to form a dried support.

13. The process of claim 10 wherein the dried support is activated at a temperature between 450° C. and 500° C. for 2 to 3 hours.

14. A process for preparing a methanation catalyst comprising the steps of:
   (a) preparing a catalyst support according to claim 1,
   (b) immersing said catalyst support into a cyclically flowing impregnating solution at a temperature between 60° C. and 90° C. for 1 to 5 hours to form a impregnated support; said impregnating solution comprising a nitric acid aqueous solution of rare earth metal oxide and an aqueous solution of nickel nitrate wherein the molar ratio of the rare earth metal and nickel is 0.21 to 0.35;
   (c) drying said impregnated support at a temperature between 80° C. and 130° C. for 8 to 16 hours forming a dried support; and
   (d) activating said dried support at a temperature between 380° C. and 600° C. for 1 to 6 hours.

15. The process of claim 14 wherein the support is immersed in the impregnating solution at a temperature of 70° C. to 90° C. for 3 to 4 hours to form a impregnated support.

16. The process according to claim 15 wherein the impregnated support is dried at a temperature between 90° C. and 110° C. for 10 to 12 hours.

* * * * *

UNITED STATES PATENT AND TRADEMARK OFFICE
CERTIFICATE OF CORRECTION

PATENT NO. : 5,962,367
DATED : October 5, 1999
INVENTOR(S) : Binglong Shen, et al.

It is certified that error appears in the above-identified patent and that said Letters Patent is hereby corrected as shown below:

On the title page:

Under [56] References Cited change "5,319,996 6/1994" to --5,316,996 5/1994 --.

Column 12, Line 26 change ":" to -- ; --.

Column 12, Line 43, delete "," after "claim 1".

Column 12, Line 46 insert a -- ; -- after the word "agent".

Column 12, Line 49 delete "," after "claim 1".

Column 13, Line 23 delete space between "1" and "00".

Column 14, Line 3 change "claim 1," to -- claim 1; --.

Signed and Sealed this

Twenty-fifth Day of July, 2000

Q. TODD DICKINSON

*Attest:*

*Attesting Officer*   *Director of Patents and Trademarks*